United States Patent [19]
Billy et al.

[11] Patent Number: 5,609,040
[45] Date of Patent: Mar. 11, 1997

[54] PROCESS AND PLANT FOR PRODUCING CARBON MONOXIDE

[75] Inventors: Jean Billy, Le Plessis Trevise; François Granier, Nogent sur Marne, both of France

[73] Assignee: L'Air Liquide, Societe Anonyme pour l'Etude et l'Exploitation des Procedes Georges Claude, Paris Cedex, France

[21] Appl. No.: 411,878

[22] Filed: Mar. 28, 1995

[30] Foreign Application Priority Data

Apr. 11, 1994 [FR] France .................. 94 04219

[51] Int. Cl.$^6$ .......................................... F25J 3/00
[52] U.S. Cl. ...................... 62/622; 62/920; 62/931
[58] Field of Search ...................... 62/24, 27, 28, 62/622, 920, 931

[56] References Cited

U.S. PATENT DOCUMENTS

| | | | |
|---|---|---|---|
| 4,217,759 | 8/1980 | Shenoy | 62/27 |
| 4,311,496 | 1/1982 | Fabian | 62/24 |
| 4,888,035 | 12/1989 | Bauer | 62/24 |
| 5,133,793 | 7/1992 | Billy | 62/24 |
| 5,295,356 | 3/1994 | Billy | 62/24 |

FOREIGN PATENT DOCUMENTS

| | | |
|---|---|---|
| 0092770 | 11/1983 | European Pat. Off. . |
| 0130284 | 1/1985 | European Pat. Off. . |
| 0313883 | 5/1989 | European Pat. Off. . |

*Primary Examiner*—Ronald C. Capossela
*Attorney, Agent, or Firm*—Young & Thompson

[57] ABSTRACT

Carbon monoxide is recovered by a cryogenic route from a gas mixture, for example from the tail gas of an operation for scrubbing with nitrogen in the preparation of an ammonia synthesis mixture, this mixture containing carbon monoxide, hydrogen and other constituents including nitrogen. The hydrogen is separated off by partial condensation and the other components by distillation of the condensate. The carbon monoxide is produced by distillation in two columns, of which only one has a head condenser fed with a flow of liquid carbon monoxide. A liquid flow is drawn at an intermediate level in the column with the head condenser and directed to the head of the other column.

24 Claims, 5 Drawing Sheets

PROCESS AND PLANT FOR PRODUCING CARBON MONOXIDE

FIELD OF THE INVENTION

The present invention relates to a process for producing carbon monoxide (CO) from a gas mixture containing essentially carbon monoxide, hydrogen and other constituents including nitrogen and possibly argon.

BACKGROUND OF THE INVENTION

In conventional technology carbon monoxide is obtained during the steam reforming or partial oxidation of hydrocarbons. Carbon monoxide of high purity can be produced in such units by employing conventional purification methods. Cryogenic purification methods are known, such as partial condensation or scrubbing with liquid methane; other processes employed for the purification are absorption processes such as the Tenneco Chemicals Cosorb, or adsorption processes (Pressure Swing Adsorption or PSA).

Carbon monoxide is also produced during the preparation of the synthesis mixture employed for ammonia synthesis, when hydrogen is obtained by partial oxidation of hydrocarbons or of coal. Such a process for the preparation of the synthesis mixture illustrated in the diagram of FIG. 1 and will be described in outline below.

After the removal of soot, in 1, and that of hydrogen sulphide, in 2, from the mixture originating from the stage of partial oxidation of hydrocarbons or of coal, in 3, stage 4 of CO conversion converts most of the CO present, under the effect of steam, into carbon dioxide ($CO_2$), producing hydrogen. After the removal of $CO_2$ by absorption, in 5, the gas mixture is subjected to a stage 6 of scrubbing with nitrogen, which yields the synthesis mixture ($N_2+3H_2$) and a tail gas containing essentially CO, $H_2$, methane $CH_4$ and $N_2$.

Also shown in FIG. 1 are the other operations of ammonia synthesis: air distillation, at 7, yielding the oxygen needed for the partial oxidation 3 and the nitrogen needed for the scrubbing 6; actual synthesis of $NH_3$ in 8, from the mixture originating from stage 6, compressed at 9; vapour decompression in a turbine 10 to drive the compressor 9; treatment of the hydrogen sulphide originating from stage 2, in 11, by a Claus process; and various heat exchangers 12 to 14.

In the prior art this tail gas from the stage of scrubbing with nitrogen was burned.

A process for the production of CO which, in the particular case above, enables the CO-rich residual gas to be reused profitably as a mixture for feeding a process for the production of CO is known from EP-A-0,092,770. One of the processes described in this patent application comprises a stage of scrubbing in methane in order to separate hydrogen from a mixture also including methane, carbon monoxide and nitrogen. The condensate thus produced is distilled in a first distillation column to separate methane from the remainder of the mixture. The gas from the head of this first column, containing chiefly carbon monoxide is distilled in a second distillation column to remove nitrogen and the remaining hydrogen, pure carbon monoxide being drawn from the sump of this column.

The carbon monoxide is subsequently used as refrigerant for the condensers at the head of the first and of the second column.

SUMMARY OF THE INVENTION

The objective of the invention is to provide a process for producing carbon monoxide with reduced energy consumption and capital costs.

To this end, the subject of the invention is a process for producing carbon monoxide from a gas mixture containing essentially carbon monoxide, hydrogen and other constituents including nitrogen and methane, in which the carbon monoxide is separated from these other constituents by distillation at an intermediate pressure, the distillation including a first distillation in a first column separating methane from the condensate and a second distillation in a second column separating carbon monoxide from the mixture originating from the first distillation, characterized in that liquid is employed at a low pressure for cooling the head of only one of the two distillation columns and liquid is drawn off at an intermediate location in the column, the head of which is cooled, to provide the reflux of the other distillation column.

The process for producing CO according to the invention may comprise one or more of the following characteristics:

liquid CO is employed at a low pressure for cooling the head of the two distillation columns;

CO from delivery of a cycle compressor, optionally after decompression to intermediate pressure, is injected directly into the sump of the second distillation column in order to ensure reboiling therein;

the low-pressure fluid from the open CO refrigeration cycle is made up of a mixture, on the one hand, of intermediate-pressure liquid CO separated off by distillation and decompressed to low pressure and, on the other hand, of CO from delivery of a cycle compressor, liquefied and decompressed to low pressure;

hydrogen and the residual products of the distillation are mixed, heated and then decompressed in a turbine to contribute to the production of cold needed for the separation stages;

a portion of the intermediate-pressure liquid CO separated off by distillation is decompressed and feeds a thermal siphon at the cold end of the heat exchanger;

hydrogen and the gaseous residual products of the distillation are mixed, heated and then decompressed in a turbine, and the liquid residual products of the distillation and optionally a portion of the condensate from the partial condensation stage are mixed, after decompression, with the turbine exhaust gas and the mixture is vaporized at the cold end of the exchanger to contribute to the production of cold needed for the separation stages;

the process is integrated into an ammonia synthesis process in which the production of the synthesis mixture ($N_2+3H_2$) includes an initial stage of partial oxidation of hydrocarbons or of coal and a final stage of scrubbing with nitrogen, and the carbon monoxide is recovered by a cryogenic route in the tail gas from the stage of scrubbing with nitrogen.

Another subject of the invention is a plant for producing carbon monoxide from a gas mixture containing essentially carbon monoxide, hydrogen and other constituents including nitrogen and methane, which includes cryogenic means for separating the constituents of the gas mixture, including a heat exchanger, a separator pot, a distillation apparatus connected to the sump of the separator pot, including a first methane/nitrogen/carbon monoxide separation column and a second nitrogen/carbon monoxide separation column, characterized in that a gas delivery conduit connects the head of one of the two columns to an intermediate location of the other of the two columns.

DETAILED DESCRIPTION OF THE INVENTION

The pressures which are referred to below are absolute pressures.

Figure 1:
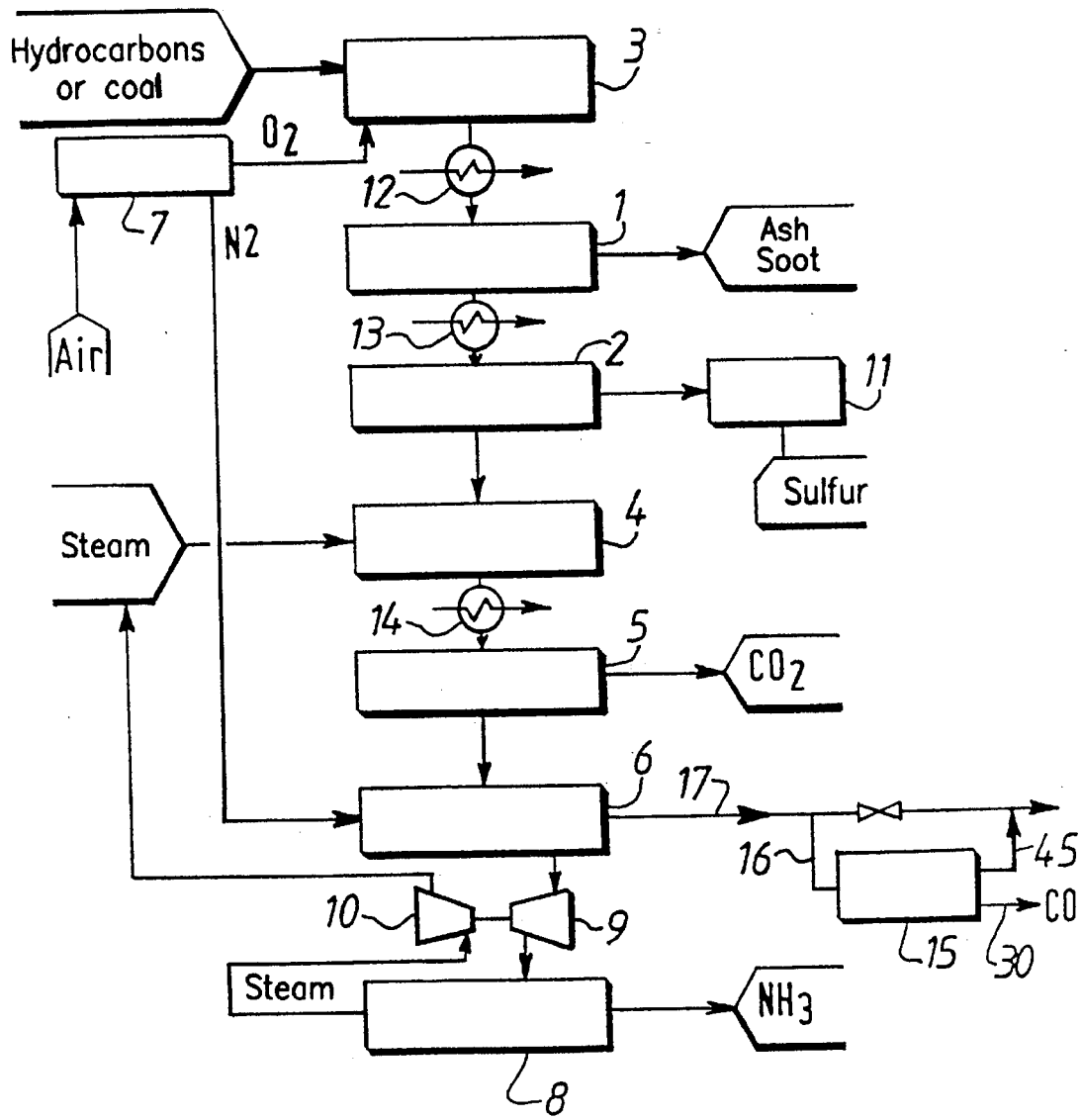
FIG. 1 depicts a block diagram of a process for the preparation of a synthesis mixture.
Figure 2:
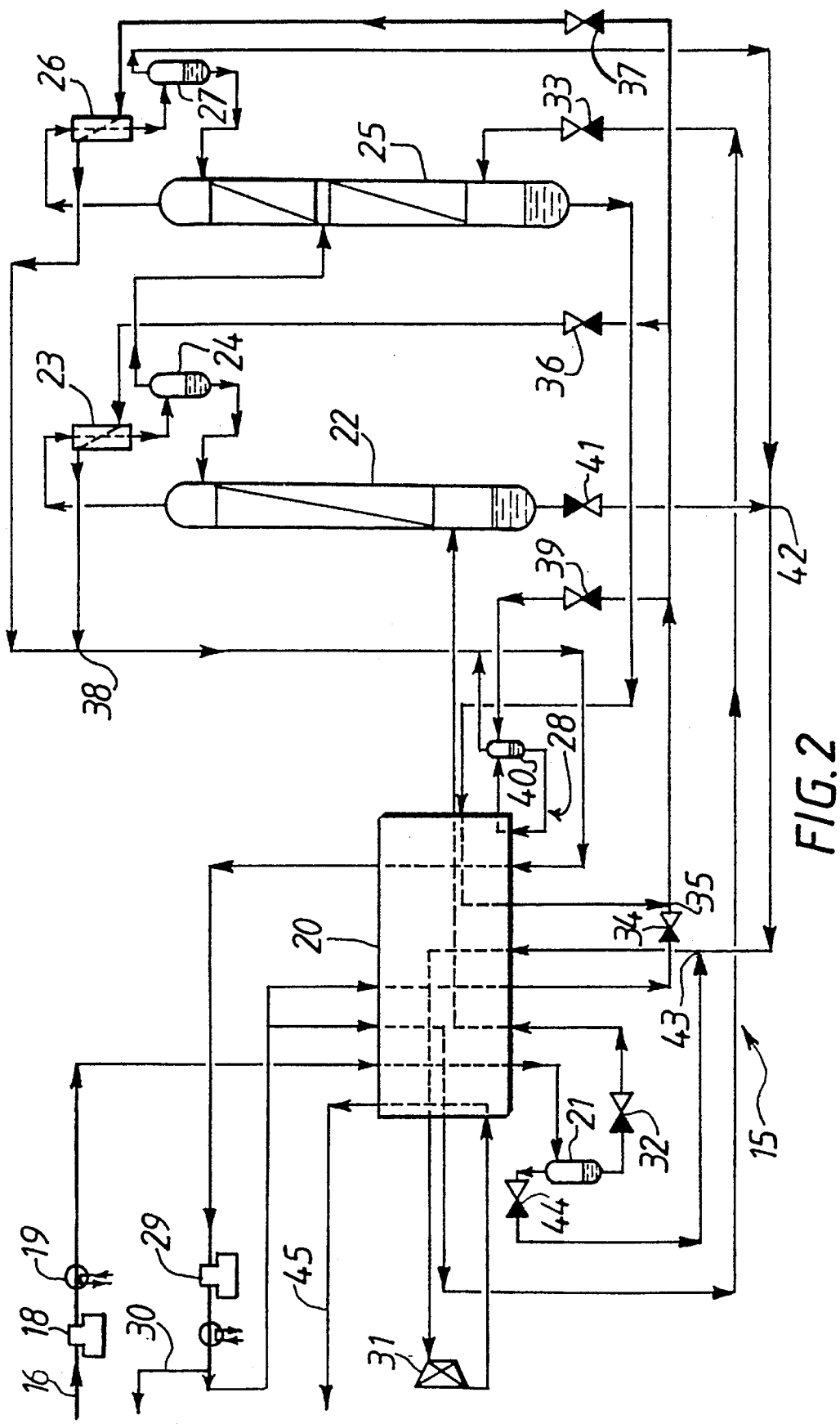
FIGS. 2 and 3 are diagrams showing, respectively, two embodiments of the plant for producing CO in accordance with the invention.

The plant shown in FIG. 2, corresponding to the block 15 in FIG. 1, is intended to produce CO under pressure, of at least 98% purity, from a feed mixture consisting typically of CO, $CH_4$, $N_2$ and $H_2$. This mixture is drawn via a conduit 16 (FIGS. 1 and 2) from the tail gas discharge conduit 17 of the equipment in FIG. 1.

The plant 15 comprises essentially a feed compressor 18 equipped with its water- or air-cooler 19, a heat exchanger 20 of the countercurrent indirect type, a separator pot 21, a first distillation column 22 equipped with a head condenser 23 and with a separator pot 24 in order to provide it with reflux, a second distillation column 25 equipped with a head condenser 26 and a separator pot 27, a thermal siphon 28, a cycle compressor 29 equipped with its water- or air-cooler, and a decompression turbine 31.

The plant operates as follows.

The feed mixture is compressed by the compressor 18 at a pressure of 10 to 12 bars. Its partial condensation through the exchanger 20 at approximately −170° C. enables hydrogen in gaseous form to be separated off in the pot 21. The liquid fraction originating from the pot 21 is decompressed in a decompression valve 32 and then partially vaporized in the heat exchanger 20 before feeding the sump of the column 22, which operates at an intermediate pressure of approximately 10 bars.

Liquid methane is separated off in the sump of column 22, while the head mixture from this column, containing nitrogen and carbon monoxide, feeds an intermediate point of column 25, which also operates at the intermediate pressure of approximately 10 bars.

Pure carbon monoxide is collected in the sump of the column 25, whereas nitrogen is drawn off at the head of this column.

The cooling requirements are provided partly by an open CO cycle, described below.

The cycle compressor 29 ensures the compression of the cycle CO to a high pressure of approximately 11 bars.

A portion of this high-pressure CO is partially cooled in the exchanger 20, decompressed in a decompression valve 33 to the intermediate pressure and injected directly into the sump of the column 25 to provide the reboiling of the second distillation.

Another portion of the high-pressure CO originating from the compressor 29 is cooled and liquefied from the hot end to the cold end of the exchanger 20 and then decompressed to the intermediate pressure in a decompression valve 34.

The CO from the sump of the column 25, supercooled in the exchanger 20, is mixed with this intermediate-pressure liquid CO in 35.

A portion of this fluid is decompressed in decompression valves 36 and 37 to a low pressure of approximately 4.5 bars and feeds the head condensers 23 and 26.

The low-pressure gaseous CO leaving the condensers 23 and 26 is reheated through the exchanger 20, after being combined in 38, before being recompressed to approximately 11 bars by the compressor 29.

The pure CO output is extracted from the high-pressure fluid of the cycle at the delivery of the compressor 29, via a production conduit 30.

To produce cold at the cold end of the exchanger 20, the thermal siphon 28 operates with low-pressure liquid CO. Liquid CO is extracted for this purpose at the intermediate pressure downstream of the point 35 and is then decompressed in a decompression valve 39 before feeding the separator pot 40 of the thermal siphon 28. Vaporization of the liquid fraction collected in the latter yields cold at the cold end of the exchanger 20, and the gaseous CO resulting from this vaporization returns to the pot 40. The gaseous phase separated off in 40 is mixed with the low-pressure gaseous CO originating from the condensers 23 and 26.

Cold is produced, furthermore, by the vaporization of liquid $CH_4$ and by the turbine 31. More precisely, the liquid methane from the sump of the column 22 is slightly decompressed in a decompression valve 41 before being added at 42 to the gaseous nitrogen from the head of the column 25, and this mixture is then added at 43 to the gaseous hydrogen which has been subjected to decompression in a decompression valve 44 on leaving the pot 21.

Liquid methane is vaporized in this mixture through the cold part of the exchanger 20 and the resulting gas is decompressed in the turbine 31 and then reheated from the cold end to the hot end of the exchanger 20, before being discharged at low pressure to the fuel gas system via a conduit 45.

Figure 3:
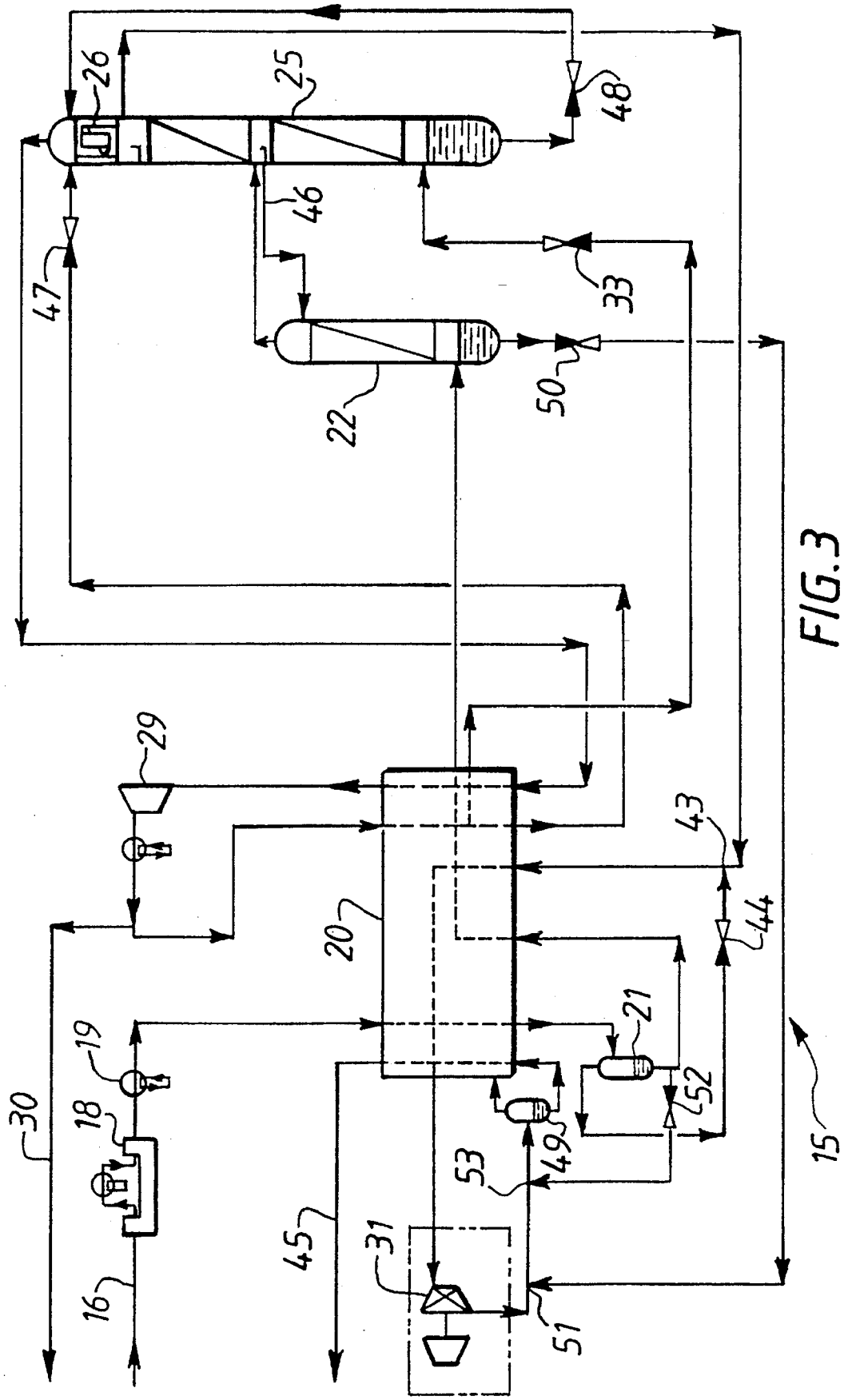

The plant shown in FIG. 3 is an alternative form of the plant shown in FIG. 2, from which it differs in the following points.

In the distillation apparatus the column 22 is no longer equipped with a head condenser or a separator pot. Its reflux is provided by drawing off nitrogen/liquid carbon monoxide mixture at an intermediate location in column 25 via a conduit 46. The head gas of column 22, which is free from methane, is injected at this same intermediate location of column 25.

Columns 22 and 25 operate at approximately 10 bars.

Cooling of the head condenser 26 of column 25 is provided, on the one hand, by high-pressure CO liquefied through the exchanger 20 and decompressed directly to low pressure in a decompression valve 47 and, on the other hand, by intermediate-pressure liquid CO collected in the sump of column 25 and decompressed to low pressure in a decompression valve 48.

The thermal siphon 28 of the plant in FIG. 2 is replaced by a separator pot 49 at the cold end of the exchanger 20.

The production of cold at the cold end of the exchanger 20 in this embodiment of the invention takes place by vaporization of a liquid containing the constituents of the tail gas which have been separated from CO in the purification operations, as described below.

As in FIG. 2, hydrogen separated off in the pot 21 is decompressed in a decompression valve 44 and added at 43 to the nitrogen from the head of the column 25, this gas mixture being next partially heated in the exchanger 20 and decompressed in the turbine 31.

Liquid methane from the sump of the column 22 is now decompressed to low pressure in a decompression valve 50 and added to the exhaust gas of turbine 31 at a location 51.

A portion of the liquid separated off in the pot 21 is decompressed in a decompression valve 52 and added to the above mixture at a location 53, and the whole feeds the separator pot 49. The liquid originating from the latter is vaporized at the cold end of the exchanger 20 and heated in the latter with the gas originating from the pot 49, to contribute to the production of cold. The final gas mixture is discharged to the fuel gas system at low pressure via the conduit 45, as in FIG. 2.

This alternative form has some advantages when compared with the plant shown in FIG. 2: the replacement of the thermal siphon 28 with a simple pot 49 and the removal of the head condenser 23 and of the separator pot 24 decrease the cost of the plant; furthermore, the energy consumption is reduced.

Figure 4:
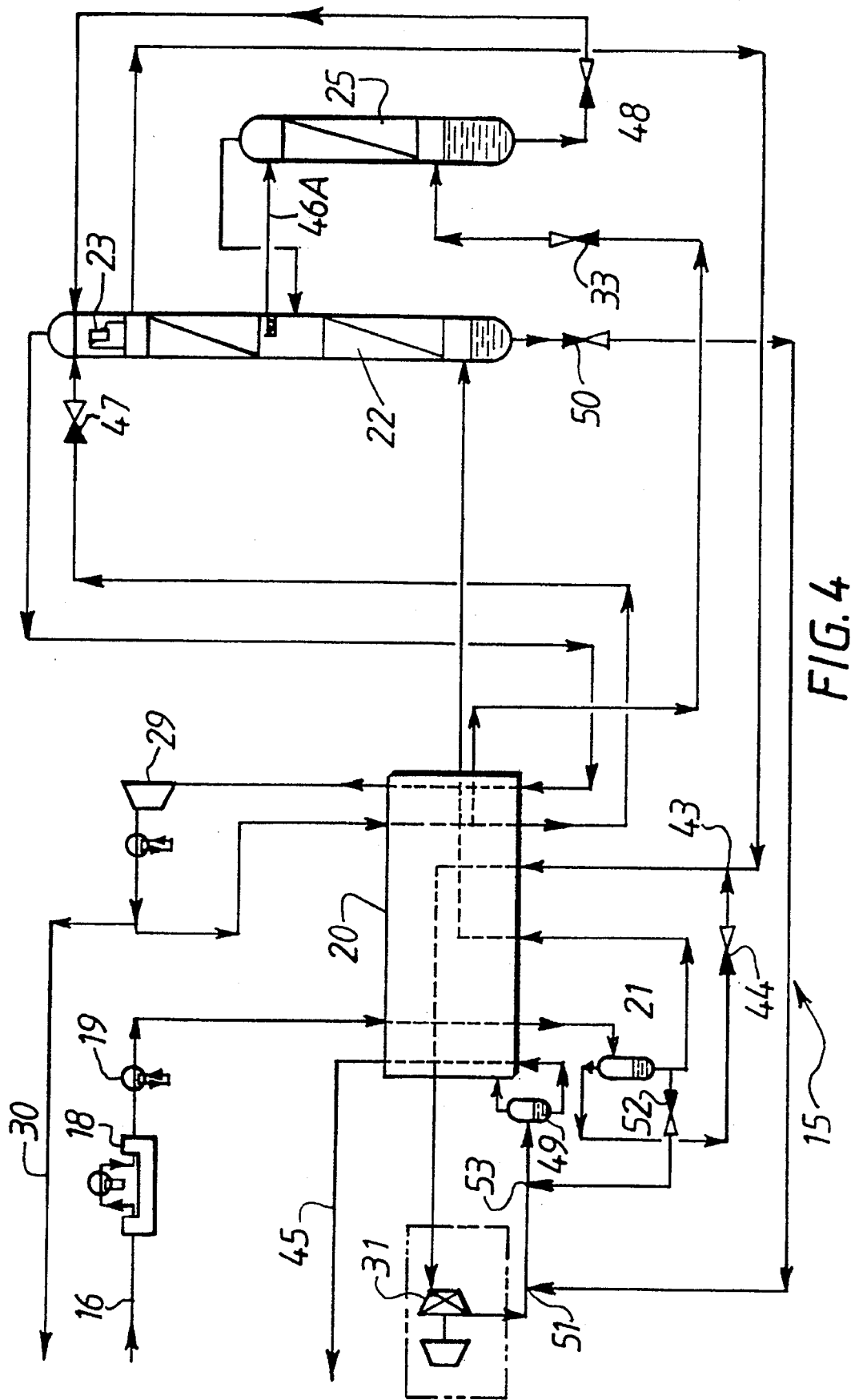
FIGS. 4 and 5 are alternative forms of plants depicted in FIGS. 2 and 3, respectively.

The plant shown in FIG. 4 is an alternative form of the plant in FIG. 2, from which it differs in the following points.

In the distillation unit the column 25 is no longer equipped with a head condenser or a separator pot. Reflux is ensured by drawing off a methane-free mixture at an intermediate location in the column 22 via a conduit 46A. The head gas from the column 25 is injected at this same intermediate location in the column 22.

The column 22 operates at approximately 10 bars.

Cooling of the head condenser 23 of the column 22 is ensured, on the one hand, by high-pressure CO liquefied through the exchanger 20 and decompressed directly to low pressure in a decompression valve 47 and, on the other hand, by intermediate-pressure liquid CO collected in the sump of the column 25 and decompressed to low pressure in the decompression valve 48.

In each of the embodiments of FIGS. 2,3 and 4 in an alternative form, the delivery of the cycle compressor 29 may be at the intermediate pressure of columns 22 and 25. In this case the decompression valves 33 and 34 (FIG. 2) or 33 (FIGS. 3 and 4) are eliminated.

Figure 5:
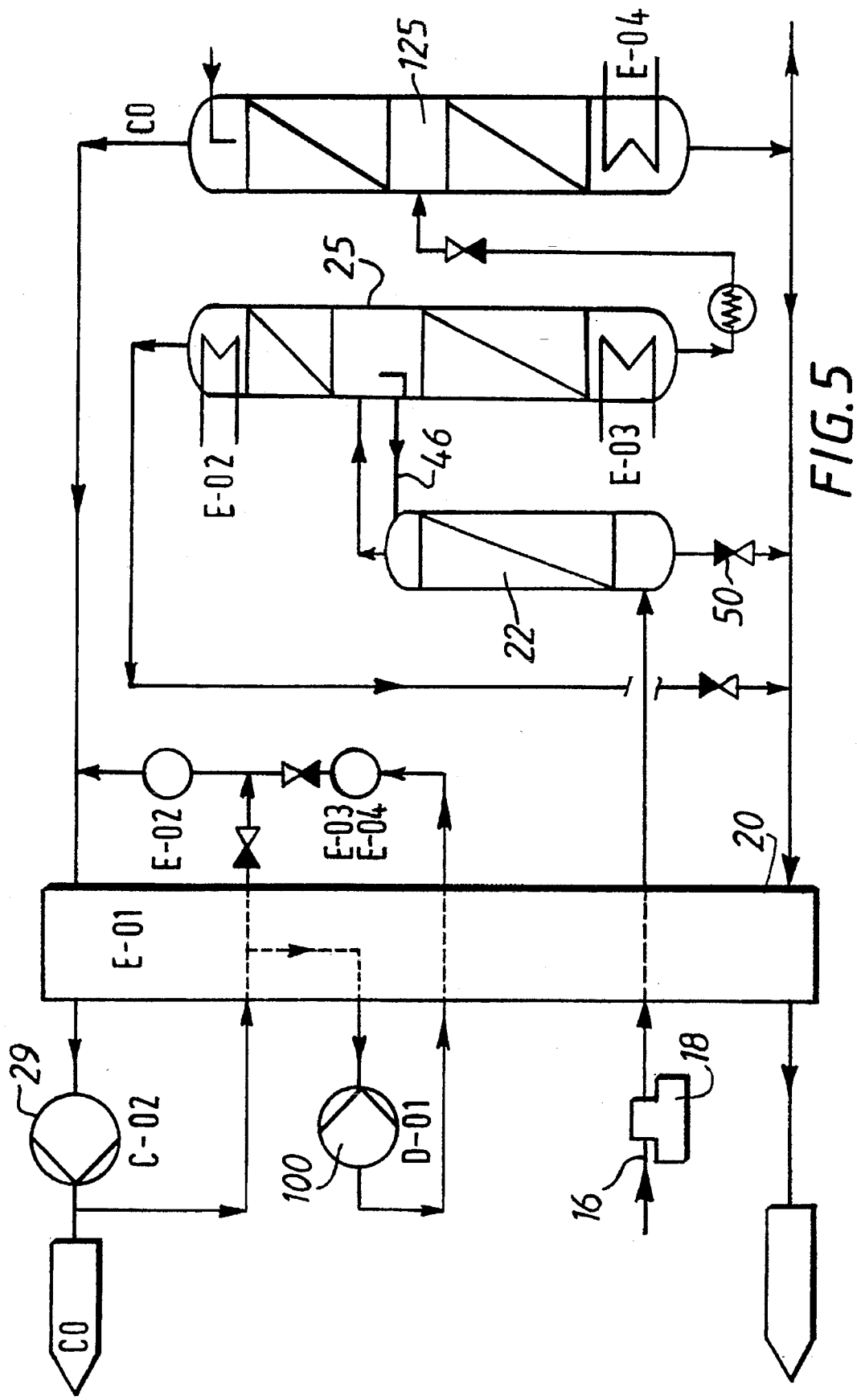

The plant in FIG. 5 is an alternative form of FIG. 3, employed when the feed mixture compressed in the compressor 18 contains argon and contains only a small proportion of hydrogen. There is consequently no partial condensation step to remove the hydrogen. Distilled in the column 22, the mixture is separated, into a methane-rich sump liquid and drawn off to be used as fuel gas. The head gas from column 22, including essentially carbon monoxide, nitrogen and argon, is directed to an intermediate level of the column 25. The sump liquid from this column includes argon and carbon monoxide; the head gas comprising nitrogen and the residual hydrogen is directed to the fuel gas conduit. The sump liquid is reheated and decompressed before being directed to an intermediate level in a third column 125 which produces pure argon in the sump and carbon monoxide at the head. A portion of the carbon monoxide is used as refrigeration cycle gas.

The refrigeration cycle, which operates at three pressure levels, is compressed to a high pressure in a compressor 29 cooled countercurrentwise in the exchanger 9 with fluids produced by the distillation. At an intermediate temperature T a first fraction of the cycle is withdrawn from the exchanger 20 and turbine-treated to an intermediate pressure. The other fraction (not turbine-treated) at high pressure is liquefied by the vaporization of the methane-rich liquid and cooled as far as the cold end of the exchanger 20 and then decompressed to low pressure. The first turbine-treated fraction at temperature T2 is split again into two streams: a first main stream is liquefied in the reboilers E03, E04 of the columns 25 and 125, and the second is reintroduced into the exchanger 20 to be liquefied therein and cooled as far as the cold end of the exchanger 20. The two liquefied streams are combined, and decompressed to low pressure using a valve to yield the first liquefied fraction.

The two liquefied fractions are combined and directed to the head of the column 125 and into the condenser E02 of column 25 to provide the refluxes of these two columns. The CO output drawn off at the head of column 125 and the fraction of vaporized cycle (E02) are reheated in the exchanger 20 as far as the hot end and once again form part of the refrigeration cycle.

We claim:

1. A process for producing carbon monoxide from a mixture containing essentially carbon monoxide, hydrogen and other constituents including nitrogen and methane, which comprises:

separating the carbon monoxide from said other constituents by distillation at an intermediate pressure, said distillation including a first distillation column having a first head and a first sump, and a second distillation column having a second head and a second sump;

separating methane in the first sump;

separating carbon monoxide in the second sump from a mixture originating from the first distillation column;

cooling the head of one of said distillation columns using liquid at low pressure; and drawing off liquid at an intermediate location in said one of said distillation columns to provide reflux to the other of said distillation columns.

2. A process according to claim 1, further comprising using the carbon monoxide as cycle fluid of an open carbon monoxide refrigeration cycle thereby contributing to the production of cold needed for the separation stages.

3. A process according to claim 2, wherein the low-pressure fluid from the open carbon monoxide refrigeration cycle is made up of a mixture of intermediate-pressure liquid carbon monoxide separated off by distillation and decompressed to low pressure, and of carbon monoxide from delivery of a cycle compressor, liquefied and decompressed to a low pressure.

4. A process according to claim 1, further comprising using liquid carbon monoxide at a low pressure to cool the head of the two distillation columns.

5. A process according to claim 1, further comprising injecting carbon monoxide from delivery of a cycle compressor directly into the second sump of the second distillation column.

6. A process according to claim 5, wherein the carbon monoxide is injected into the second sump after decompression to an intermediate pressure.

7. A process according to claim 1, wherein hydrogen and residual products of the distillation are mixed, heated and then decompressed in a turbine to contribute to the production of cold needed for the separation stages.

8. A process according to claim 1, wherein hydrogen and gaseous residual products of the distillation are mixed, heated and then decompressed in a turbine, and liquid residual products of the distillation are mixed, after decompression, with turbine exhaust gas, and the mixture is vaporized at the cold end of a heat exchanger to contribute to the production of cold needed for the separation stages.

9. A process according to claim 8, wherein the liquid residual products of the distillation include a portion of a condensate from a partial condensation stage.

10. A process according to claim 1, wherein a portion of intermediate-pressure liquid carbon monoxide separated off by distillation is decompressed and feeds a thermal siphon at the cold end of a heat exchanger.

11. A process according to claim 1, integrated into an ammonia synthesis process wherein production of a synthesis mixture of nitrogen and hydrogen includes an initial stage of partial oxidation of hydrocarbons or of coal, and a final stage of scrubbing with nitrogen, and wherein the carbon monoxide is recovered by a cryogenic route in a tail gas from the final stage of scrubbing with nitrogen.

12. A process according to claim 1, wherein sump liquid from the second distillation column containing carbon monoxide and a constituent with volatility which is intermediate between that of carbon monoxide and that of methane, is distilled in a third distillation column, which produces a carbon monoxide-enriched vapor at its head and a fluid rich in said constituent with intermediate volatility in its sump.

13. A process according to claim 12, wherein the constituent is argon.

14. A plant for producing carbon monoxide from a gas mixture containing essentially carbon monoxide, hydrogen and other constituents including nitrogen and methane, comprising: cryogenic means for separating the constituents of the gas mixture, and including a heat exchanger fluidly connected to a distillation unit, said distillation unit including a first distillation column having a first sump and a first head, and producing a methane-rich fraction in the first sump, and a second distillation column having a second sump and a second head, and producing a carbon monoxide-rich fraction in the second sump, and a gas delivery conduit connecting the head of one of said distillation columns to an intermediate location in the other of said distillation columns.

15. A plant according to claim 14, further comprising an open carbon monoxide refrigeration cycle including a cycle compressor, said carbon monoxide refrigeration cycle being fluidly connected to said heat exchanger.

16. A plant according to claim 15, wherein a head condenser of one of the two distillation columns is connected to a conduit for liquid carbon monoxide from the carbon monoxide refrigeration cycle via a low-pressure decompression valve.

17. A plant according to claim 15, wherein a head condenser of one of the columns is connected to a conduit for liquid carbon monoxide from the refrigeration cycle via a low-pressure decompression valve, and the head of the other column is fed with liquid by a conduit connected to an intermediate location in the column having the head condenser.

18. A plant according to claim 15, wherein the second distillation column includes reboiling means which include a conduit connector to the delivery of the cycle compressor, via a decompression valve.

19. A plant according to claim 15, which, for feeding a low-pressure portion of the refrigeration cycle, further includes low-pressure decompression means connected to a conduit for drawing liquid carbon monoxide from the distillation unit and, downstream of the heat exchanger, connected to the delivery of the cycle compressor.

20. A plant according to claim 14, wherein the distillation unit further comprises a separator pot, and first conduit means operatively associated for drawing fluid from a head of the separator pot and second conduit means for residual products from the distillation unit, said first and second conduit means being connected to each other and then to heating passages of the heat exchanger from the cold end toward the hot end, said passages being connected to the inlet of a decompression turbine.

21. A plant according to claim 14, wherein the distillation unit further comprises a separator pot, and first conduit means operatively associated for drawing fluid from a head of the separator pot and second conduit means for gaseous residual products from the distillation unit, said first and second conduit means being connected to each other and then to heating passages of the heat exchanger, said passages being connected to an inlet of a decompression turbine, and wherein conduits for drawing liquid residual products from the distillation unit are connected to an exhaust conduit of the turbine, which is connected to the cold end of the heat exchanger.

22. A plant according to claim 14, wherein a thermal siphon fed via a decompression valve by intermediate-pressure liquid carbon monoxide is connected to the cold end of the heat exchanger.

23. A plant according to claim 14, integrated into an ammonia synthesis equipment having means for producing a synthesis mixture of nitrogen and hydrogen, said producing means including a first unit for partial oxidation of hydrocarbons or of coal, and a last unit for scrubbing with nitrogen, and wherein a feed of the plant is connected to a discharge of tail gas from the last unit for scrubbing with nitrogen.

24. A plant according to claim 14, wherein the distillation unit comprises a third distillation column, and means for directing a sump liquid from the second distillation column to the third distillation column.

* * * * *